United States Patent [19]
Roddy et al.

[11] Patent Number: 6,127,922
[45] Date of Patent: Oct. 3, 2000

[54] VEHICLE SECURITY SYSTEM WITH REMOTE SYSTEMS CONTROL

[75] Inventors: Timothy S. Roddy, Plymouth; Edward G. Curtindale, Farmington Hills, both of Mich.

[73] Assignee: Lear Automotive Dearborn, Inc., Southfield, Mich.

[21] Appl. No.: 09/197,402

[22] Filed: Nov. 20, 1998

[51] Int. Cl.$^7$ .............................. B60R 25/10; G06F 7/04
[52] U.S. Cl. ................... 340/426; 340/425.5; 340/539; 340/825.31; 340/825.69; 341/176; 455/99
[58] Field of Search .................... 340/426, 539, 340/428.5, 825.37, 825.32, 825.3, 825.69, 825.72; 455/575, 90, 410, 99, 411; 341/176

[56] References Cited

U.S. PATENT DOCUMENTS

| | | |
|---|---|---|
| 4,241,870 | 12/1980 | Marcus .................................. 296/37.7 |
| 4,247,850 | 1/1981 | Marcus .................................... 340/694 |
| 4,523,178 | 6/1985 | Fulhorst .................................. 340/539 |
| 5,510,791 | 4/1996 | Viertel et al. ...................... 340/825.72 |
| 5,699,055 | 12/1997 | Dykema et al. ................... 340/825.22 |
| 5,808,373 | 9/1998 | Hamanishi et al. ................... 307/10.1 |

*Primary Examiner*—Donnie L. Crosland
*Attorney, Agent, or Firm*—Brooks & Kushman P.C.

[57] ABSTRACT

A vehicle security system includes a transmitter that is alternatively permanently mounted in or selectively removable from the vehicle. The transmitter communicates with a security system controller associated with the vehicle so that the transmitter is only useable under selected, authorized conditions. The transmitter enables a vehicle owner to access and operate a plurality of remotely located systems or devices such as a garage door opener, a home security system or a pager system, for example.

18 Claims, 1 Drawing Sheet

VEHICLE SECURITY SYSTEM WITH REMOTE SYSTEMS CONTROL

BACKGROUND OF THE INVENTION

This invention generally relates to a vehicle security system and, more particularly to a system that allows a user to operate a plurality of remotely located devices.

There are many different vehicle security systems available today. In most cases, a vehicle owner has a hand-held unit, such a key fob, that permits remote activation of the vehicle door lock, trunk lock and ignition, for example. Audible alarms are typically associated with such vehicle security systems that can be remotely activated or deactivated through the key fob.

While currently available systems are useful, it is desirable to provide systems that have a greater capacity to perform a larger variety of functions. Further, it is desirable to provide a vehicle security system that operates in a more sophisticated manner than most commercially available systems.

This invention provides an improved vehicle security system that also provides a user with the capacity to operate remotely located devices.

SUMMARY OF THE INVENTION

In general terms, this invention is a security system for use in a vehicle. The system includes a transmitter having at least one selectively useable switch that generates a signal for communicating with at least one receiver that is located remotely from the vehicle. The transmitter includes a housing that is alternatively permanently mounted in or removable from the vehicle. Embodiments where the transmitter is removable provide the added advantage of having a portable transmitter. A receptacle is supported in the vehicle and has a portion that receives the transmitter housing. When the housing is inserted into the receptacle, the transmitter is useable from within the vehicle. A controller supported on the vehicle communicates with the transmitter and selectively enables the transmitter to operate. The controller effectively prevents an unauthorized person from using the transmitter.

The various features and advantages of this invention will become apparent to those skilled in the art from the following detailed description of the preferred embodiments. The drawings that accompany the detailed description can be briefly described as follows.

DETAILED DESCRIPTION OF THE PREFERRED EMBODIMENT

Figure 1:
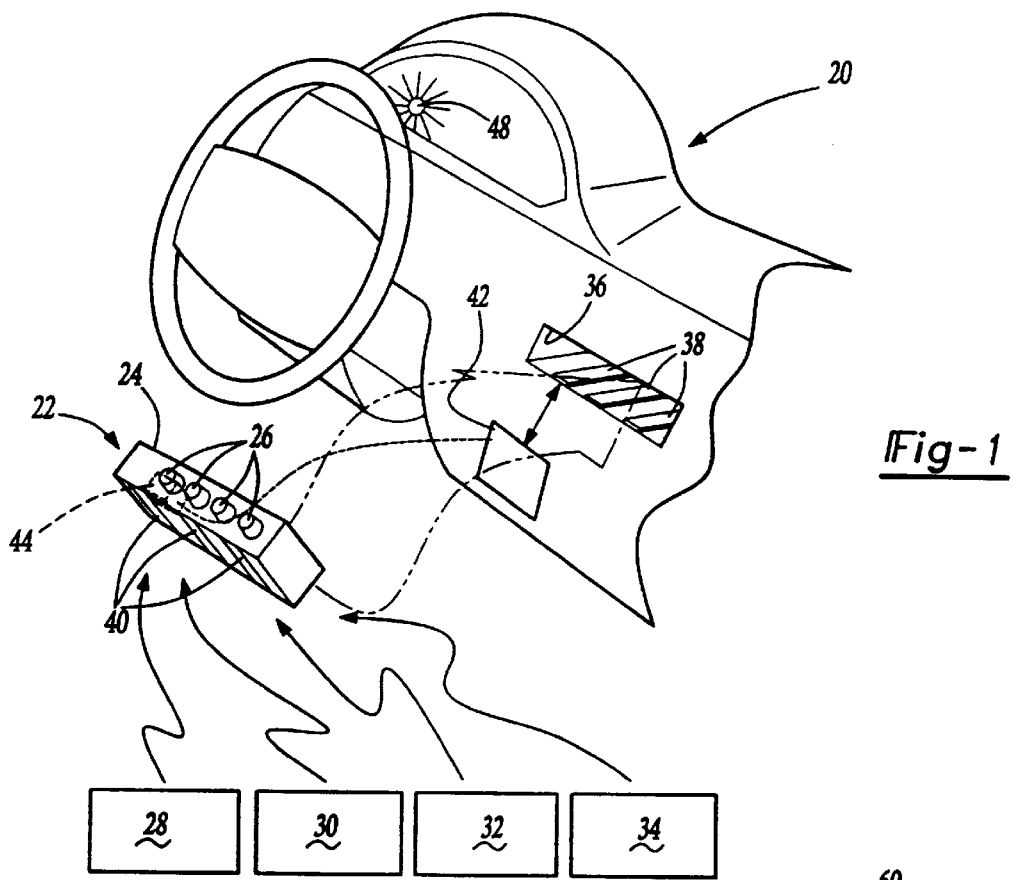
FIG. 1 is a schematic illustration of a security system designed according to this invention

FIG. 1 illustrates a vehicle security system 20. A transmitter unit 22 includes a housing 24 that supports a plurality of switches 26. The switches 26 can be buttons that are pressed by a user, for example. In the embodiment of FIG. 1, the housing 24 preferably is selectively removable from the vehicle and is small enough to be held within a user's hand and can be transported within a purse, for example.

The transmitter 22 preferably is useable to communicate with a plurality of systems or devices located remotely from the vehicle. Examples of such systems include a garage door opener 28, a home security system 30, an individual pager 32 and a valet system 34. Each of these systems or devices are illustrated schematically in FIG. 1.

The transmitter 22 preferably is portable so that it is removable from the vehicle and can be operated in a location remote from the vehicle. A receptacle 36 preferably is provided within the vehicle. The housing 24 and the receptacle 36 are configured so that the transmitter 22 can be mounted or supported within the vehicle on an instrument panel, visor, headliner, steering wheel or dashboard, for example. The receptacle 36 preferably includes at least one electrical coupling 38 that cooperates with a corresponding electrical coupling link 40 on the transmitter housing 24. When the transmitter 22 is received within the receptacle 36, the connection between the couplings 38 and 40 provides a communication link for a system controller 42 to communicate with the transmitter 22. The connection between the couplings 38 and 40 also preferably provides electrical power to the transmitter unit 22.

The transmitter 22 preferably includes an activation module 44. The activation module communicates with the system controller 42 so that the controller 42 selectively enables the transmitter 22 to be used. Since the transmitter 22 is capable of operating or communicating with devices such as a home security system, it is necessary to prevent unauthorized use of the transmitter 22. Therefore, the controller 42 preferably communicates with the activation module 44, which selectively enables the transmitter 22 to operate.

The transmitter 22 preferably is not useable until it receives an authorized activation signal from the controller 42. The content of the authorization signal preferably dictates whether the transmitter 22 can be used even after it is removed from the vehicle. The authorization preferably includes encrypted, rolling code strategies to prevent an unauthorized user from using a "code grabber" to obtain later use of the transmitter 22.

The controller 42 alternatively is programmed to provide at least two authorized activation signals to the activation module 44. A first activation signal enables the transmitter 22 to be used whenever the housing 24 is received within the receptacle 36 and the vehicle is being operated. In other words, a first authorization code or signal allows the transmitter 22 to be functional only when the ignition of the vehicle is turned on so that once a vehicle owner turns off the engine and exits the vehicle, the transmitter 22 is no longer useable. This prevents an unauthorized user from breaking into a vehicle and then gaining access to a home security system, for example.

A second authorized activation code or signal preferably allows the transmitter 22 to be useable even when the transmitter 22 is removed from the vehicle. In this embodiment, the transmitter 22 preferably communicates with the controller 42 via remote communication, such as radio frequency signals, so that a user can selectively enable or disable the transmitter 22 even when the housing 24 is not received in the receptacle 36. Any such remote communication preferably includes encrypted, rolling code strategies to enhance security and prevent unauthorized use by "code grabbers."

Examples of how the authorization may work include requiring that the vehicle ignition 50 be turned on before the transmitter 22 is enabled. Alternatively, when an unlock function of a vehicle remote entry system 52 is utilized, that may enable the transmitter 22. Once the vehicle ignition is turned off or the driver exits the vehicle and locks the doors, the transmitter 22 preferably is disabled. In vehicles that include an electronically encoded ignition key 54, an even greater amount of security can be realized by coupling the enabling function of the activation module 44 to an authentication initiated by the encoded ignition key.

Additionally, the activation module 44 and controller 42 can be programmed to require a combination of more than one of the above. Even higher security levels may include requiring a specific order or sequence of more than one of the above conditions or authorizations. The security link 56 provides a significant advantage in keeping the system secure from unauthorized use.

In the preferred embodiment, whenever the transmitter 22 is removed from the vehicle and the transmitter 22 is not enabled, the only way to enable the transmitter 22 is by properly placing the housing 24 within the receptacle 36 and then enabling the transmitter in the normal manner.

While the embodiment of FIG. 1 includes a housing 24 that is removable from the vehicle, the operation and control methods of this invention apply equally to a system where the transmitter 22 is permanently mounted within the vehicle. An example of the latter is shown as transmitter 22' mounted on a vehicle headliner 60 in FIG. 2. Some modifications are possible in the embodiment of FIG. 2 compared to FIG. 1.

Figure 2:
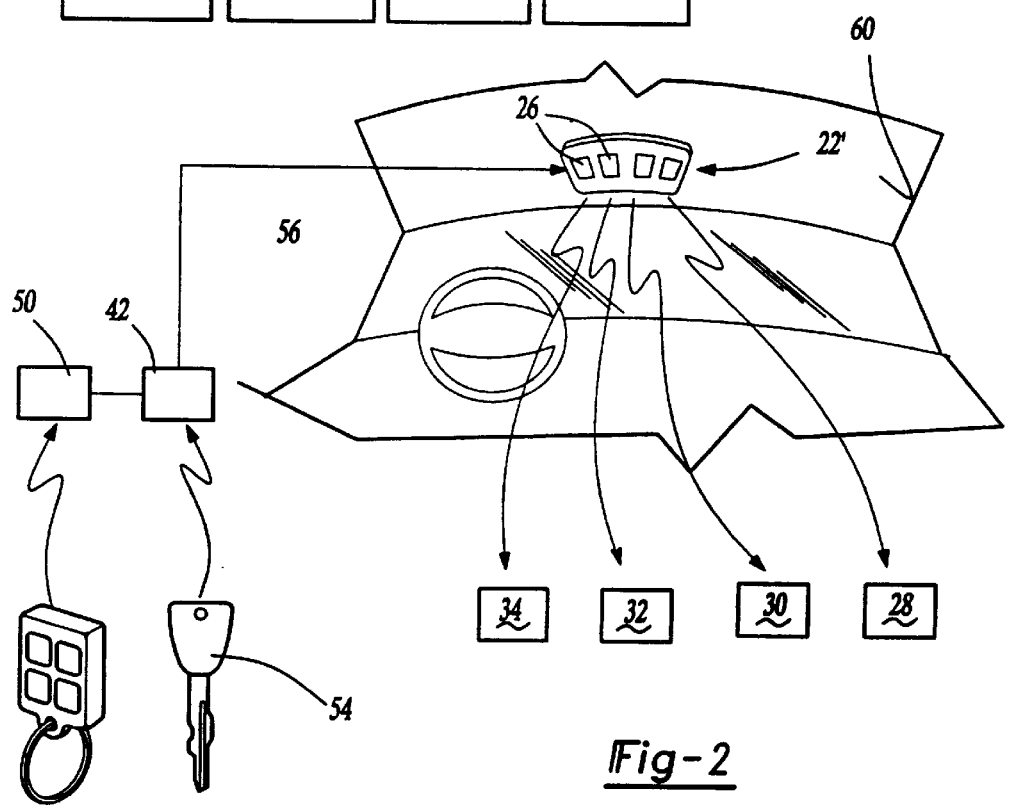
FIG. 2 is a schematic illustration of another embodiment of a system designed according to this invention.

For example, since the transmitter 22' of FIG. 2 is not removable, there is no need to account for use of the transmitter 22' outside of the vehicle. Authorization codes and strategies can be made even more secure because direct links within the vehicle are always present.

The transmitter 22 preferably is used to gain access to a home security system for a variety of reasons, such as turning on lights, unlocking doors, etc. The garage door opener 28 preferably is operated in a conventional manner by using the transmitter 22. Another feature of this invention is to use the transmitter 22 to communicate with an individual pager 32. This can be especially useful in situations such as when a parent is waiting to drive a child home from school, for example. Instead of requiring the child to wait outside, the parent can use the transmitter 22 to send a signal to an individual pager 32 that lets the child know that their parent is outside waiting to take them home.

The transmitter 22 preferably also allows a vehicle driver to access and utilize a valet system 34. The valet system 34 preferably allows the vehicle owner to signal a valet when it is time to retrieve the vehicle. The valet preferably is provided with an indicator, which could be a control board at the valet station for example, that is responsive to the transmitter 22 and indicates that the vehicle owner desires the valet to retrieve the vehicle.

In the preferred embodiment all of the remote activation signals are encrypted and utilize a rolling code feature to enhance the security of the system so that a potential thief cannot intercept a signal and later copy it to gain access to the vehicle security system.

The preceding description is exemplary rather than limiting in nature. Variations and modifications to the disclosed embodiments may become apparent to those skilled in the art that do not necessarily depart from the purview and spirit of this invention. The scope of legal protection given to this invention is only limited by the following claims.

What is claimed is:

1. A security system for use in a vehicle, comprising:
a transmitter having at least one selectively actuatable switch that generates a signal for communicating with at least one receiver that is located remotely from the vehicle, said transmitter having a housing that supports said switch;
a receptacle supported on the vehicle and having a portion that receives said transmitter housing so that said housing is selectively removable from the vehicle; and
a controller supported on the vehicle that communicates with said transmitter, said controller selectively enabling said transmitter to operate, wherein said transmitter includes an activation module having a code reading portion that determines whether an authorized activation code has been received from said controller, said activation module arranged to render said transmitter unusable until the authorization code has been received by said activation module.

2. The system of claim 1, wherein said receiver is associated with a device selected from the group of devices consisting of a garage door opener, a home security system, and a pager.

3. The system of claim 1, wherein communications between said transmitter and said receiver and said controller include rolling code encrypted signals.

4. The system of claim 1, wherein said authorized activation code enables said transmitter to be used after said housing has been removed from said receptacle subsequent to receiving said activation code.

5. The system of claim 1, wherein there are two said authorized activation codes, a first authorized code that enables said transmitter to be used only while said housing is received in said receptacle and a second authorized code that enables said transmitter to be used when said housing has been removed from said receptacle.

6. The system of claim 1, wherein said transmitter includes a first communication link that is supported by said housing and said controller includes a second communication link supported by the vehicle, said first communication link being coupled to said second communication link when said housing is received in said receptacle.

7. The system of claim 6, wherein said controller selectively enables said transmitter to be operable through said coupling of said first and second communication links.

8. The system of claim 1, wherein said transmitter includes a plurality of switches and there are a corresponding plurality of receivers located remotely from the vehicle and wherein said transmitter is useable to communicate with said receivers when said housing is received by said receptacle and when said housing is removed from the vehicle.

9. A security system for use in a vehicle, comprising:
a transmitter permanently mounted in the vehicle and having a plurality of switches that are useable to selectively generate communication signals for communication with a plurality of devices remote from the vehicle;
a controller supported by the vehicle and generating an authorized activation code; and
a security link supported by the vehicle and interconnecting the controller and the transmitter and wherein the controller supplies the authorized activation code to the transmitter via the security link such that the transmitter is only operational subsequent to receiving the activation code.

10. The system of claim 9, wherein the security link comprises a hard wire connection between the transmitter and the controller.

11. The system of claim 9, wherein the authorized activation code includes an encrypted rolling code signal.

12. The system of claim 9, wherein the plurality of devices that receive communication signals from the transmitter include a garage door opener device, a home security device and a local area pager device.

13. The system of claim 9, wherein the controller generates the authorized activation code only after a preselected condition is met.

14. The system of claim 9, wherein the transmitter remains operational after receiving the authorization code only under preselected conditions.

15. A method of controlling a security system that includes a transmitter supported in a vehicle that also includes an electronic controller, comprising the steps of:

(A) mounting the transmitter within the vehicle;

(B) determining whether a preselected condition exists; and (C) enabling the transmitter to be used by a user by supplying an activation code from the electronic controller to the transmitter only after the condition of step (B) exists.

16. The method of claim 15, wherein step (A) includes permanently mounting the transmitter in the vehicle and wherein the method further includes providing a direct communication link between the transmitter and the controller on the vehicle.

17. The method of claim 15, wherein step (B) includes determining whether an authorized code has been received by one of a vehicle remote keyless entry device or an ignition switch supported in the vehicle.

18. The method of claim 15, further comprising the step of maintaining the transmitter in an enabled state subsequent to performing step (C) while at least one preselected operation condition exists and deactivating the transmitter when the preselected condition ceases to exist.

* * * * *